Sept. 1, 1959     O. H. BANKER     2,901,924
ACCESSORY DRIVE

Filed Aug. 5, 1954     3 Sheets-Sheet 1

INVENTOR
OSCAR H. BANKER
BY Charles *[signature]*
ATTORNEY

Sept. 1, 1959     O. H. BANKER     2,901,924
ACCESSORY DRIVE
Filed Aug. 5, 1954                                3 Sheets-Sheet 2
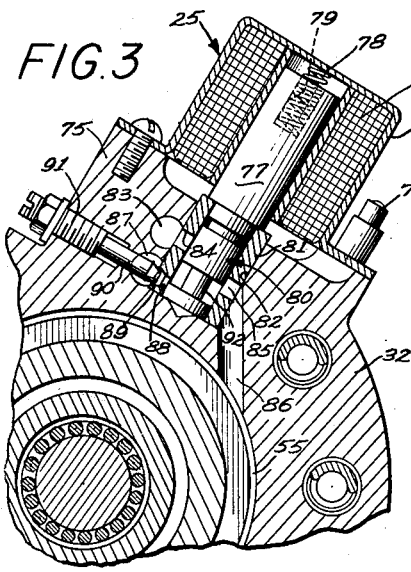
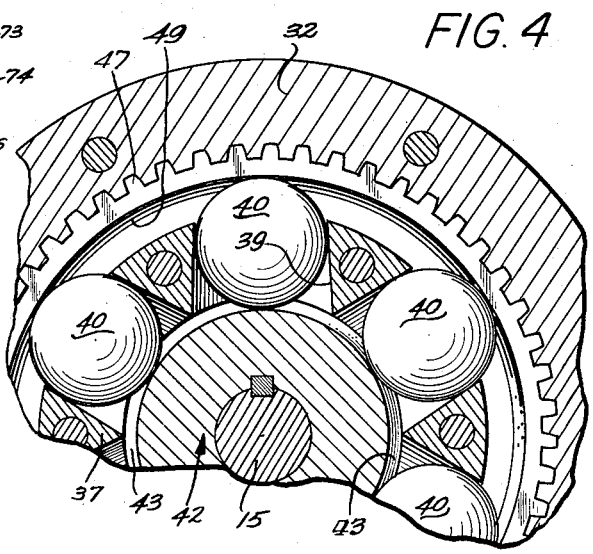
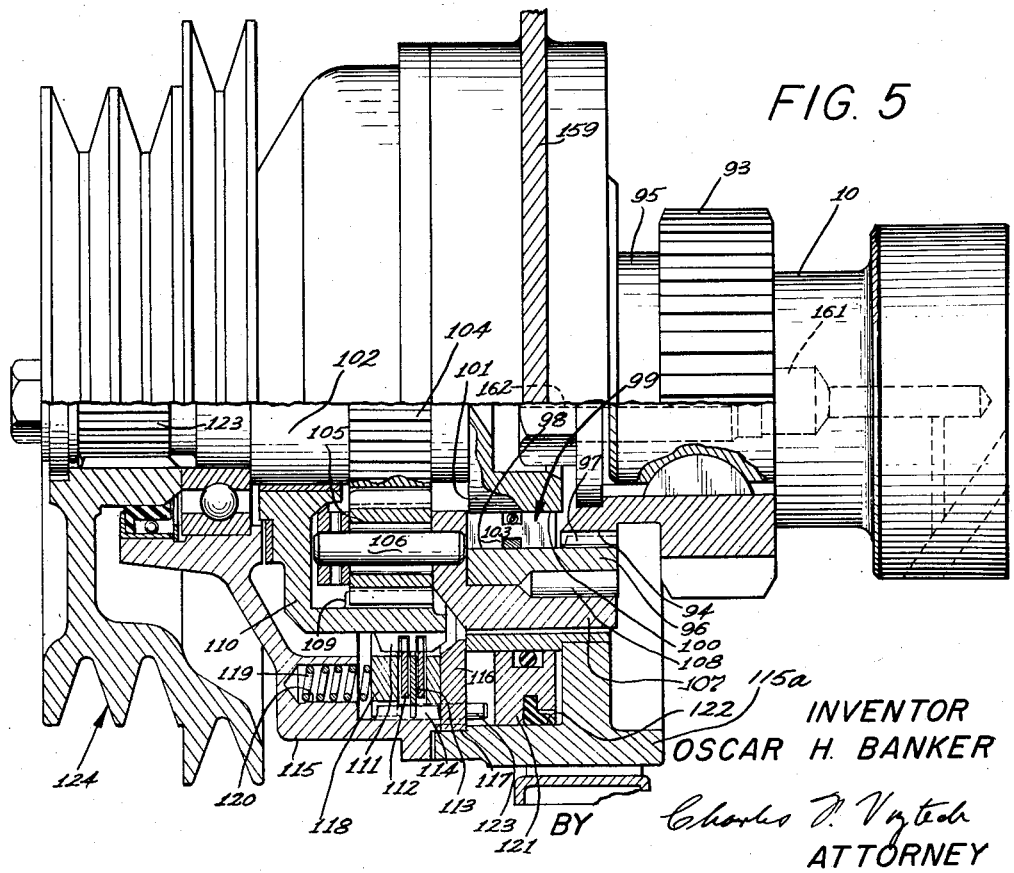
INVENTOR
OSCAR H. BANKER
ATTORNEY Sept. 1, 1959    O. H. BANKER    2,901,924
ACCESSORY DRIVE Filed Aug. 5, 1954    3 Sheets-Sheet 3

INVENTOR
OSCAR H. BANKER

BY
Charles P. Vojtech
ATTORNEY

United States Patent Office 2,901,924
Patented Sept. 1, 1959

2,901,924

ACCESSORY DRIVE

Oscar H. Banker, Evanston, Ill., assignor to New Products Corporation, Chicago, Ill., a corporation of Delaware Application August 5, 1954, Serial No. 448,053

7 Claims. (Cl. 74—752)

This invention relates to a change speed drive mechanism for the accessories of an internal combustion engine.

An internal combustion engine for automotive vehicle is presently required to drive a number of accessory devices such as a water pump, fan, generator, air compressor for air brakes, refrigerant compressor for air conditioning, lubricating oil pump, etc. The output required of these devices is generally constant as long as the engine is running. The engine speed varies, however, from a low idle to the top speed of which it is capable, representing the difference in speed between 400 r.p.m. and 4000 r.p.m. Since the accessories must be capable of delivering their required output at the idle speed of the engine, the size of the accessories is dictated by the size required to produce the output at 400 r.p.m. At 4,000 r.p.m., however, this size is several times greater than is actually needed, and the energy required to drive these devices at such high speeds is entirely wasted.

It has been proposed to interpose a change speed transmission between the engine and the accessories, the transmission being such that below a predetermined speed of the engine it will shift automatically to an over-speed ratio so that the accessories will be driven at a higher r.p.m. than the engine, and that above the said predetermined speed of the engine the transmission will provide a direct drive between the engine and accessories. By a judicial selection of the engine speed at which the over-speed becomes effective, and by arranging to have the accessories driven at a lesser speed than the engine above the selected speed the accessories may be driven at speeds which vary from 750 r.p.m. minimum to 2500 r.p.m. maximum. The high cost of these prior devices, and the fact that they were noisy, prevented them from becoming adopted on a large scale.

It is an object of this invention to provide a change speed mechanism for an accessory drive of an internal combustion engine which will be inexpensive to make, will be substantially noiseless in operation and which will automatically drive the accessories at a higher speed relative to the engine speed below a predetermined engine speed.

Another object of this invention is the provision of a simple change speed mechanism for an accessory drive of an internal combustion engine wherein the change in ratio provided by the transmission is effected by means of friction devices instead of by toothed devices such as gears or the like.

A more specific object of this invention is the provision of a change speed transmission utilizing a plurality of balls operating between inner and outer races in the manner of planetary gearing, with means for changing the effective distance between the races to control the operation of the device.

Another specific object of this invention is the provision of a change speed transmission for an accessory drive of an internal combustion engine which employs rolling friction devices for effecting a change in speed ratio in the device and wherein means are provided for automatically rendering the friction means effective in a very gradual manner to prevent the formation of flat spots in the friction means.

As another object, this invention seeks to provide a change speed transmission of the friction type employing a sprag type one-way clutch for effecting one speed therethrough, and rolling friction means for effecting another drive therethrough, said device being readily disassembled and assembled to facilitate servicing thereof.

As a further object of this invention is the provision in a change speed transmission for driving accessories normally driven by an internal combustion engine, of means utilizing a fluid operated device for effecting one ratio therethrough and for utilizing resilient constantly effective means in opposition to the hydraulic means for restoring the device to another drive, said hydraulic means including a restricted vent for controlling the application of the resilient means to the drive mechanism.

These and other objects and features of this invention will become apparent from the following detailed description when taken together with the accompanying drawings in which:

Fig. 3 is a fragmentary side elevation, in section, of the control means for the change speed device of Fig. 2, the section being taken along line 3—3 of Fig. 2;

Fig. 4 is a fragmentary end elevation, in section, of the friction drive means used in the change speed mechanism of Fig. 2, the section being taken along line 4—4 thereof;

Fig. 5 is a side elevation, in quarter section, of a modification of the change speed mechanism using planetary gearing in place of the friction devices of Fig. 2;

Figure 1:
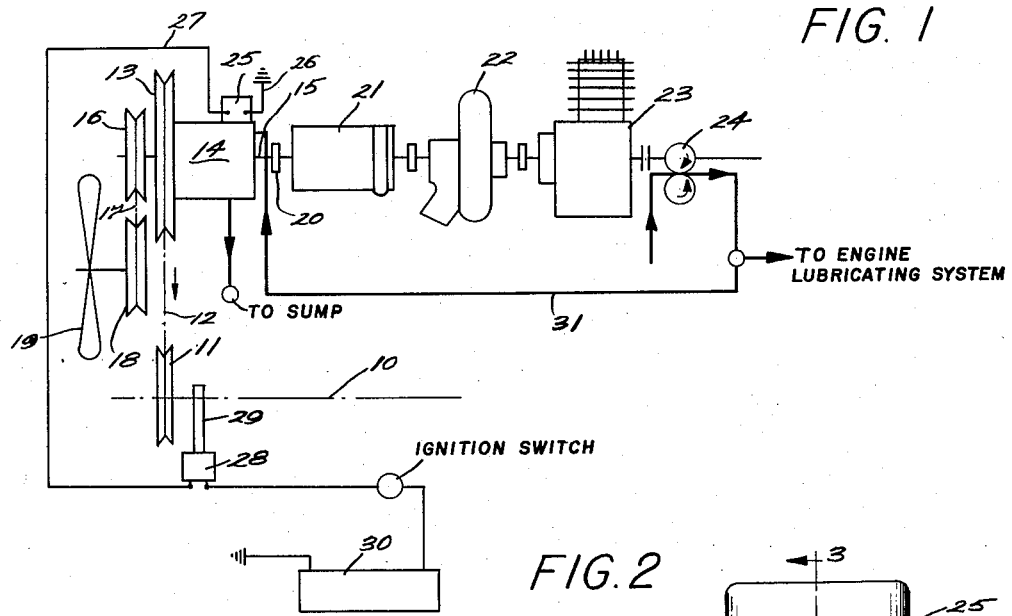
Fig. 1 is a schematic diagram of the change speed mechanism of this invention, the automatic control therefor and the devices which may be driven thereby.

Referring now to Fig. 1 for a detailed description of this invention, the diagram depicted therein includes a center line 10 which may be the center line of the crankshaft of an internal combustion engine having a pulley 11 mounted at the front end thereof and adapted to be driven thereby. A belt 12 connects pulley 11 with the input pulley 13 of the change speed mechanism 14 of this invention, the latter being secured to the exterior of the engine block at some convenient location. The output shaft 15 of the change speed mechanism 14 extends through the mechanism, and at its left hand end as viewed in Fig. 1 is connected to drive a pulley 16 which may be connected by a belt 17 to the pulley 18 for driving the fan 19 for cooling either the engine or the liquid cooling system for the engine.

The right hand end of shaft 15 as viewed in Fig. 1 may be connected through a series of couplings 20 of any suitable flexible type to a generator 21, a water pump 22, a compressor 23 for air or refrigerant or the like, and a gear type pump 24 for circulating lubricating oil under pressure through the moving parts of the engine. It is contemplated that either of the accessories 21, 22, 23 or 24 may be removed from the drive line from the change speed mechanism 14 individually and replaced without disturbing any of the other devices in this group.

The control for change speed mechanism 14 by which the ratio through the mechanism is changed comprises a solenoid 25 mounted at a convenient location on change speed mechanism 14 and having one lead 26 therefrom connected to ground, and the other lead 27 connected through a speed responsive governor or switch 28 driven through suitable gearing 29 (shown schematically) from engine crankshaft 10 to a battery 30. Solenoid 25 is used to operate a valve, hereinafter to be described in detail, which, in turn, controls the operation of a hydraulic actuator used to control the effectiveness of the higher speed ratio.

It is understood that the arrangement of the accessories and transmission shown in Fig. 1 is merely illustrative and that the arrangement of these various elements can be altered if desired. It is contemplated, however, that the engine lubricating oil pump 24 will be utilized to supply oil under pressure through a conduit 31 to the control valve of the change speed mechanism 14, thereby eliminating a separate pump to be used solely for this purpose.

Figure 2:
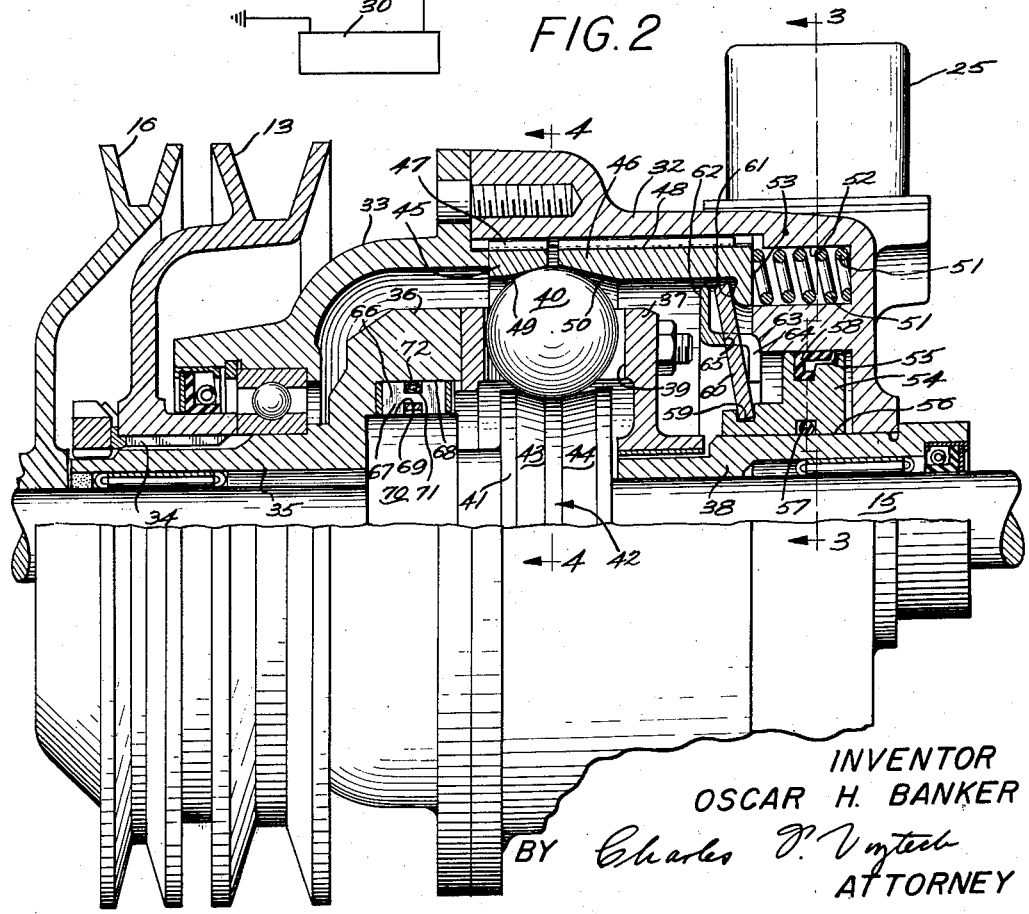
Fig. 2 is an enlarged side elevation in quarter section of the change speed mechanism of this invention showing the details of the principal parts thereof.

The details of construction of change speed mechanism 14 are shown in enlarged quarter section in Fig. 2. The mechanism is contained in a housing comprising a main casting 32 and a closure casting 33 bolted or otherwise secured to main casting 32. Input pulley 13 has a splined connection 34 with a sleeve 35 the right hand end 36 of which is enlarged and secured to a carrier 37 supported for rotation on a fixed sleeve 38 in main casting 32.

Carrier 37 is formed with a plurality of radially disposed cylindrical slots 39 in each of which is retained a ball 40 preferably made of hardened steel. For ease of manufacture, balls 40 may be adapted from ball bearings, and because of the standard nature and large production of such bearings the cost of the balls may be relatively low.

The slots 39 are equiangularly spaced relative to one another to provide a well balanced arrangement of the balls 40. Said balls are retained in carrier 39 in part by an inner race 41 having a wide angle V-groove 42 formed in the outer periphery thereof, the groove being so disposed relative to the surfaces of balls 40 that the sides 43 and 44 of the groove contact the surfaces of balls 40 with a line contact and that there is no other contact between inner race 41 and said balls 40. Inner race 41 is secured for rotation with shaft 15 to which pulley 16 is drivingly secured as aforesaid.

Balls 40 are retained in carrier 37 also by an outer race comprised of two cones 45 and 46 which are held nonrotatably in housing 32 by splines 47 and 48, respectively. The conical surface of cone 45 is shown at 49 and the conical surface of cone 46 is shown at 50. It is contemplated that cone 46 will be movable axially toward and away from balls 40 so that in one position surface 50 will contact balls 40 and wedge them against inner race surfaces 43 and 44 to provide a friction drive between the inner and outer races. Inasmuch as carrier 37 is the driver, that is, it receives the drive from pulley 13 and constitutes the input member of the transmission, and outer race cones 45 and 46 are stationary, it follows that inner race 41 must then rotate in the same direction as carrier 37, but at a higher speed than the carrier. The speed ratio between carrier 37 and inner race 41 is determined by the relative diameters of the inner and outer races and can be varied to suit the requirements of the engine to which the change speed mechanism is apertinent.

The means for axially shifting outer race cone 46 is comprised of a plurality of compression springs 51 retained in sockets 52 in casting 32 and bearing against the right hand end 53 of outer race cone 46. Springs 51 are arranged in a circle and symmetrically with respect to a diameter of the circle so as to exert a substantially balanced force against outer race cone 46. It may be observed that springs 51 will serve to move outer race cone 46 to the left as viewed in Fig. 2 and into engagement with balls 40. Since the springs are continuously effective unless counteracted by some greater force, the mechanism will normally be conditioned for an over-speed drive. Thus the over-speed drive will be effective when the engine is rotating at a relatively low speed, or at idling speed, at which speed it is desired that the accessories be rotated at a higher speed than is generally available in present internal combustion engines.

The means for effecting a shift of outer race cone 46 to the right in opposition to springs 52 comprises a piston 54 of annular form and operating in a similarly annularly formed cylinder 55 located in the central region of casting 32 and formed in part by the casting and in part by the exterior surface 56 of sleeve 38. Suitable packing 57 and 58 on the inner and outer peripheries of piston 54 insure a fluid tight connection between the piston and its cylinder.

The left hand end of piston 54 extends into casting 32 and is formed with a peripheral groove 59 in which are retained the inner ends of a plurality of struts 60 extending radially outwardly and into contact with a bead 61 formed on the interior of outer race cone 46. A fulcrum is provided for struts 60 by a stamped strut retainer 62 which is substantially hat-shaped in section and is welded or otherwise secured to casting 32, preferably at 63. The retainer 62 is provided with a slot 64 for each strut 60, said slots 64 terminating in a fulcrum 65 against which the strut 60 may bear.

When oil or other fluid under pressure is admitted to the right hand side of piston 54, the piston will move to the left as viewed in Fig. 2 and will move the inner ends of the struts 60 with it. The struts will fulcrum on retainer 62 at the fulcrum point 65 so that the outer ends of the struts, which bear against bead 61, will move to the right or in a clockwise direction as viewed in Fig. 2, thereby counteracting the force of springs 51 to compress them and to move outer race cone 46 likewise to the right. Such movement of cone 46 shifts surface 50 out of contact with balls 40, with the result that said balls may rotate freely in their slots 39 without transmitting any drive from carrier 37 to inner race 41. Said race 41 and its shaft 15 will then slow down because of the load imposed thereon by the accessories driven by shaft 15, and when the speed of shaft 15 drops to substantially the same speed as sleeve 35 and pulley 13, a direct drive will be established between shaft 15 and sleeve 35 through a one-way clutch 66 interposed between these two members.

Clutch 66 is comprised of a plurality of sprags 67 which are adapted frictionally to grip an outer cylindrical surface 68 formed on the interior of right hand end 36 of sleeve 35, and a cylindrical surface 69 formed on the exterior of a cylinder 70 mounted for rotation with shaft 15. A garter type spring 71 operates in a suitable groove 72 in sprags 67 and serves to retain said sprags on surface 69.

The sprag type one-way clutch 66 provides an automatic drive in one-to-one ratio between shaft 15 and sleeve 35 when balls 40 are ineffective to transmit a drive at an over-speed between these two members.

As stated above, the admission of fluid under pressure into cylinder 55 is controlled by solenoid 25. This solenoid is shown in section in Fig. 3, as is also the valve controlled thereby. Referring now to Fig. 3, solenoid 25 is comprised of a coil 73 encased in a suitable housing 75 secured to a boss 75 on casting 72, and provided with suitable terminals 76, only one of which is shown, for establishing a connection between coil 73 and the electrical control circuit therefor.

An axially reciprocable armature 77 is retained within coil 73, said armature being continuously urged downward and to the left as viewed in Fig. 3, by a compression spring 78 disposed in a recess 79 in the upper end of armature 77 and bearing against the adjacent wall of housing 74. It is contemplated that when solenoid 25 is energized, armature 77 will be drawn into coil 73 against the action of spring 78, and when coil 73 is deenergized, spring 78 will push armature 77 downward out of coil 73.

Armature 77 is rigidly secured to a cylindrical balanced valve 80 operating in a suitably ported sleeve 81 fixed in a recess 82 in boss 75. An inlet conduit 83 is formed in boss 75 and admits fluid under pressure from conduit 31 to a port 84 in sleeve 81. The fluid under pressure is conducted through valve 80 to port 85 in sleeve 81 and thence through a passageway 86 to cylinder 55. An exhaust passageway or conduit 87 is also provided in boss 75, said passageway communicating with an exhaust port 88 formed in sleeve 81. The outer region of exhaust port 88 is tapered as at 89 to form a seat for a needle valve 90, the position of which may be adjusted by turning the threaded barrel 91 thereof in a correspondingly threaded opening in boss 75.

It may be apparent that by properly adjusting the position of needle valve 90 relative to its seat 89, the rate of egress of fluid from port 88 to exhaust conduit 87 may be regulated so that the fluid in cylinder 55 is emptied gradually. This gradual movement of the exhaust fluid results in a similarly gradual movement of piston 54 and struts 60, and in a gradual application of pressure from springs 51 to balls 40 through surface 50 on outer race cone 46. Thus, a shift into an over-speed drive may be effected without shock, and therefore without the formation of undesirable flat spots in balls 40 and in their co-operating conical surfaces.

Valve 80 has a peripheral groove 92 formed therein, the axial width and disposition of which relative to ports 84, 85 and 88 is such that when solenoid 25 is energized and armature 77 is pulled into coil 73, the groove will provide direct communication between ports 84 and 85 to admit fluid under pressure from inlet conduit 83 to cylinder passageway 86, and port 88 will be blocked by the adjacent valve body. When, on the other hand, solenoid 25 is deenergized so that spring 78 pushes armature 77 downward and to the left as viewed in Fig. 3 to the position shown, that is, until the end of valve 80 strikes the bottom of the recess 82, port 85 will be in direct communication through groove 92 with port 88, and inlet port 84 will be cut off. This will cause the fluid under pressure in cylinder 55 to be vented gradually through needle valve 90, the rate being adjusted to produce the desired slow movement of piston 54.

Thus, the release of the over-speed drive may be effected immediately, but its engagement will be brought about gradually through the operation of the needle valve 90. The abrupt release of the over-speed drive, however, does not result in a correspondingly abrupt operation of one-way clutch 66 to establish a direct drive, inasmuch as the various accessories will possess enough inertia to continue rotating at a slowly diminishing speed until the speed at which the one-way clutch becomes effective is reached, and at that speed the one-way clutch will then continue to drive the accessories, but at the same speed as sleeve 36 and pulley 13.

It may be observed from the foregoing description that the friction drive will not only be smoothly engaged and disengaged, but that the drive, when in effect, will likewise be smooth because of the continuous rolling drive provided by the balls.

Where noise is not a factor and greater strength is a requirement, as in large trucks or busses, the modification shown in Fig. 5 may be more desirable than the one just described. It differs from the preceding design mainly in the use of planetary gearing to effect a change in speed ratio rather than rolling balls or other rolling friction type drive. It also differs from the preceding design in that it is adapted to be driven directly from the crankshaft of the engine and hence is designed to be mounted at the forward end thereof.

Referring now to Fig. 5, the engine crankshaft is shown at 10, to the forward end of which is keyed a gear 93 which may be the cam shaft driving gear, said gear 93 having external splines 94 formed on a smaller diameter step spaced from gear 93 by a run-out groove 95. A ring 96 surrounds splines 94 and has internal splines 97 in engagement with splines 94 so as to be driven by gear 93. A smooth cylindrical surface 98 is formed on the interior of ring 96 adjacent splines 97 and constitutes the outer race of a one-way clutch 99, the inner race 100 being formed on the exterior of a flange 101 on a driven or output shaft 102 concentrically disposed with respect to the axis of crankshaft 10. Between surfaces 100 and 98 are interposed a plurality of sprags 103 which function to provide a one-way drive between ring 96 and shaft 102 when the latter tends to rotate more slowly than ring 96. The drive through one-way clutch 99 is, of course, a direct drive so that the speed of rotation of driven shaft 102 when clutch 99 is effective is the same as the speed of rotation of crankshaft 10.

The speed changing gearing is comprised of a sun gear 104 fixed to shaft 102 in any suitable manner so as to be rotatable therewith, a plurality of planet pinion gears 105 arranged around the periphery of sun gear 104 and mounted for rotation on individual pins 106 fastened to a carrier 107. Said carrier 107 is telescoped over ring 96 and is secured thereto by a pin 108 which constrains carrier 107 to rotate with ring 96 which, in turn, is constrained to rotate with gear 93 and shaft 10.

Planet pinions 105 also mesh with a ring gear 109 formed on the interior of a drum 110 mounted for free rotation about shaft 102. The exterior of drum 110 is formed with teeth 111 to which are splined for axial movement thereon two or more friction brake plates 112 in the form of washers or annuli. The brake plates 112 are adapted to be engaged frictionally by one or more stationary annular plates 113 which are splined to teeth 114 formed on the interior of a fixed housing 115. Plates 112 and 113 are pressed together for frictional braking therebetween by a fixed reaction plate 116 retained against axial movement relative to housing 115 by a shoulder 117 formed on the interior of a companion housing 115a to which housing 115 is bolted, housing 115 being formed to bear directly against reaction plate 116 and to retain it frictionally against shoulder 117.

On the opposite side of plates 112 and 113 from reaction plate 116 is an axially movable pressure plate 118 which may also be splined to teeth 114 so as to be fixed angularly relative to housing 115. A plurality of springs 119 operating in circumferentially spaced recesses 120 in housing 115 continuously urge pressure plate 118 to the right as viewed in Fig. 5. Thus, when springs 119 are effective, pressure plate 118 is moved to the right to compress plates 112 and 113 against reaction plate 116 thereby holding plates 112 frictionally against rotational movement, which, in turn, causes drum 110 and ring gear 109 to be stationary. If at the time carrier 107 is rotated by gear 93 sun gear 104 will, of course, be rotated in the same direction as shaft 10 but at a higher speed. By properly selecting the relative numbers of teeth on sun gear 104, ring gear 109 and planet pinions 105, any desired over-speed ratio may be provided.

Pressure plate 118 is controlled by an annular piston 121 axially reciprocable in a correspondingly annular cylinder 122 formed in companion housing 115a. Although piston 121 is on the opposite side of fixed reaction plate 116 from pressure plate 118, the latter is reached through a plurality of axially reciprocable pins 123 extending through suitable openings in plate 116 and adapted to be contacted by piston 121 at one end and pressure plate 118 at the other end. The length of pins 123 is such that full releasing movement of pressure plate 118 may be effected by piston 121 without having the latter strike reaction plate 116. It will be noted that pins 123 are shorter than the normal axial spacing between pressure plate 118 and piston 121 so that the latter will not interfere with the application of full spring pressure against pressure plate 118 and plates 112 and 113.

Piston 121 is operated by the same solenoid controlled hydraulic system which was described with reference to Figs. 1 to 4 inclusive and hence the details of this system have been omitted in the Fig. 5 modification. Suffice it to say that when fluid pressure is introduced into cylinder 122 to the right hand side of piston 121 as viewed in Fig. 5, the piston will move to the left and will engage and move pins 123 which, in turn, will cause pressure plate 118 to move in the same direction against the action of springs 119 to release plates 112 for rotation about shaft 102. The presence of a load on shaft 102 will cause a drive to be effected through one-way clutch 99 at the same speed as shaft 10. When the fluid pressure behind piston 121 is vented by solenoid 25 and valve 80 as shown in Fig. 3 for example, springs 119 will cause pressure plate 118 to engage plates 112 and to compress them against plates 113 and reaction plate 116 to arrest the rotation of drum 110 and its internal ring gear 109, whereupon the drive will then be transmitted through the planetary gears 105 and sun gear 104 to shaft 102 at a speed which is greater than the speed of shaft 10.

The output end of shaft 102 is formed with splines 123 which drive a multiple pulley 124 from which the drive may be transmitted to the various accessories to be driven by the engine.

It may be noted that since external splines 94 are of a smaller outside diameter than the root diameter of the teeth of gear 93, said gear 93 may be formed or finished by a broaching operation without interference from splines 94. It may also be observed that when it is desired to disassemble the entire change speed transmission shown in Fig. 5 from shaft 10, such disassembly may be accomplished by withdrawing housing 115 from housing 115a and in this manner removing plates 112 and 113, drum 110, planet gears 105, carrier 107, ring 96, clutch 99 and shaft 102 together as a unit. This is especially convenient inasmuch as clutch 99 is formed of a plurality of individual sprags which may tend to fall out and make their handling cumbersome and inconvenient unless they can be handled in assembled relation. The fact that splines 97 extends inwardly beyond surface 98 creates a retaining wall for the sprags by which they may be withdrawn as a unit. Similarly, when the transmission is to be assembled upon shaft 10, it may be noted that sprags 103 may be assembled with respect to surface 98 while they are in a vertical position, that is, with their axes pointing upward. Shaft 102 is then inserted into the transmission from the right as viewed in Fig. 5 and simultaneously turned in a free wheeling direction to facilitate movement of the sprags on surface 100. Once so assembled, the sprags may be carried with the change speed gearing and even tilted to a position wherein the axis of shaft 102 is horizontal or concentric with shaft 10 without in any way disturbing them.

The Fig. 5 construction thus provides a rugged and readily serviced design which is well adapted for use on trucks, buses and other vehicles which normally get a great deal of wear and rough usage.

Figure 6:
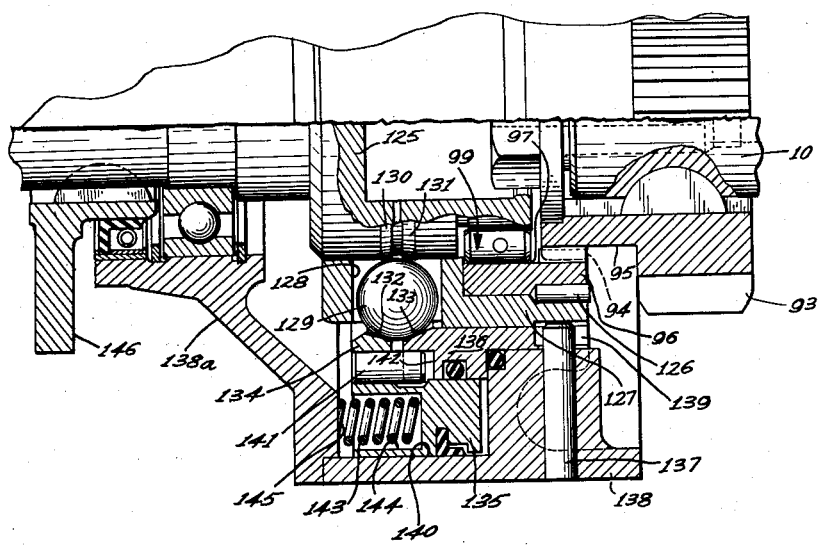
Fig. 6 is a fragmentary side elevation in quarter section of a second modification of the change speed mechanism of Fig. 2.

A second modification which combines the desirable smooth-rolling features of the Fig. 2 design with the ease of assembly of the Fig. 5 design is shown in Fig. 6.

Referring now to Fig. 6, gear 93 is shown keyed to crankshaft 10 and having external splines 94 separated from gear 93 by run-out groove 95, all as in the Fig. 5 construction. Ring 96 is connected through internal splines 97 to be driven from splines 94, and is adapted to be connected through a one-way sprag type clutch 99 to an output shaft 125. Ring 96 is pinned as at 126 to a carrier 127 which is formed with radially disposed cylindrical openings 128 in which are retained a plurality of balls 129. Shaft 125 has a V-groove formed in the exterior surface thereof, the groove being comprised of a pair of oppositely inclined surfaces 130 and 131.

Balls 129 are retained in openings 128 by a pair of oppositely inclined tapered surfaces 132 and 133 disposed respectively on a radially inwardly extending flange 134 on an axially reciprocable piston 135 on the one hand, and on the end of a fixed ring 136 surrounding carrier 127 and held against rotation therewith by a radially disposed pin 137 retained in housing 138 and extending into a notch 139 formed in the right hand end (Fig. 6) of the ring.

Piston 135 operates in an annular cylinder 140 formed in part by an axially extending flange on housing 138, and by the exterior surface of fixed ring 136. Rotary movement of piston 135 is prevented by a plurality of pins 141 passing through flange 134 of piston 135 and extending into suitable recesses 142 in ring 136 which as stated above is held against rotation by pins 137 in housing 138. It may be observed, however, that pins 141 do not prevent axial movement of piston 135.

Movement to the right (Fig. 6) of piston 135 in its cylinder 140 is effected by a plurality of compression springs 143 retained in suitable recesses 144 formed for that purpose in piston 135 and facing to the left toward a radial abutment 145 formed in a companion housing 138a bolted or otherwise secured to housing 138. Movement of the piston to the left in opposition to the springs 143 is effected by a hydraulic system which may be identical to the one described with reference to the Fig. 2 modification and incorporating the solenoid 25 and valve 80. It is contemplated that when fluid under pressure is introduced behind piston 135, that is, to the right hand side thereof as viewed in Fig. 6, said piston will move to the left against the action of springs 143 and will cause an axial separation of surfaces 132 and 133. When such separation occurs, balls 129 are effectively out of contact with surfaces 130 and 131 and therefore shaft 125, if connected to a load, will tend to lag behind shaft 10, whereupon one-way clutch 99 takes hold and a one-to-one drive is provided between shaft 10 and output shaft 125. When the pressure of the fluid behind piston 135 is vented, springs 143 will move piston 135 to the right as viewed in Fig. 6, thereby moving surface 132 toward surface 133 and eventually causing a radial inward movement of balls 129 in their recesses 128 against surfaces 130 and 131.

It is contemplated that pressure exerted by springs 142 will be sufficient to cause a frictional drive to be produced between balls 129 and surfaces 130 and 131 so that when carrier 127 is rotated by shaft 10 through splines 94, 97 ring 96 and pins 126 (surfaces 132 and 133 being stationary) a drive will be transmitted to shaft 125 through contact between balls 129 and surfaces 130 and 131, the drive being at a higher speed than that of shaft 10.

It is contemplated that a pulley or other power take-off shown generally at 146 will be keyed to and driven by shaft 125.

In the Fig. 6 form, as in the Fig. 5 and Fig. 2 forms, the application of spring pressure is effected in a gradual manner so that all shock and uneven wear of the balls 129 and the cooperating surfaces 130, 131, 132 and 133 will be avoided. It is contemplated that in the Fig. 6 form, the characteristic ease of assembly of the Fig. 5 form will be inherent herein. Thus, when companion housing 138a is unbolted from housing 138, piston 135, fixed ring 136, carrier 137, ring 96, clutch 99 and shaft 125 may be withdrawn from housing 138 as a unit. As in Fig. 5, carrier 127 and ring 96 may be assembled together, and then the sprags of clutch 99 may be dropped into the space behind splines 97.

In the Fig. 2 and Fig. 6 forms slight axial play is provided for shafts 15 and 125 so that axial movement of the movable outer race can be followed by the inner race sufficiently to insure uniform contact between the balls and all four conical surfaces while the balls are driving.

Figures 7, 8:
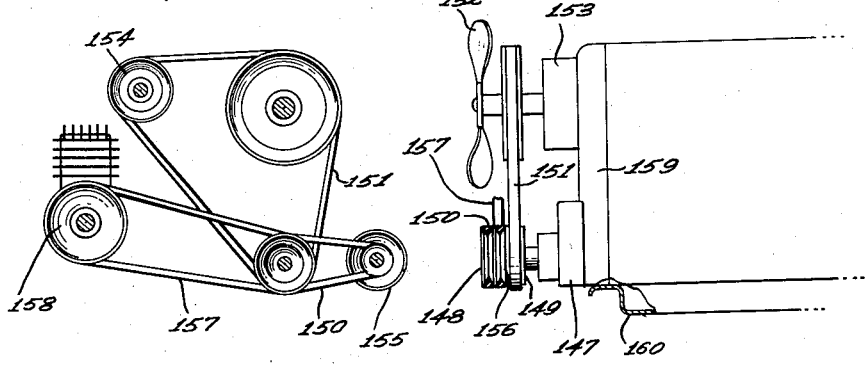
Figs. 7 and 8 are respectively end and fragmentary side elevations of an engine mounted change speed transmission of this invention showing an example of how the transmission may be connected to certain accessories of the engine.

Figs. 7 and 8 show a popular form of assembly for the accessories of an engine relative to the engine itself. In such assembly the transmissions of Figs. 5 and 6 may be attached to the front of the engine block as shown at 147, the driven or output shaft of the transmission being provided with a plurality of pulleys 148, 149, 156 which may be connected by belts 150, 151 and 157, respectively, to the various accessories. Thus, belt 151 may be used to drive the fan 152 and the water pump 153 as well as the generator 154, belt 150 may be used to drive special accessories like a hydraulic pump 155 and belt 157 may drive a compressor 158.

The transmission may be secured to any convenient forward part of the engine as for example, the timing gear cover 159 or to the engine block itself. It is desirable that the installation of the transmission will not interfere with other parts of the engine such as the pan 160. When the transmission is mounted on the forward end of crankshaft 10, it may be readily lubricated by utilizing the oil passage 161 (Fig. 5) in the crankshaft and extending it through the forward end of the shaft into the hollow portion of the shaft, the oil passing through passage 161 and then through drilled passageways 162 to the gears or balls as the case may be from which it may drain into pan 160.

Although this invention has been described with reference to its application to a direct drive and over-drive transmission, obviously the same results can be obtained by using an under-drive and direct drive combination. Thus by turning either of the foregoing forms around so that the low speed is an under-drive, i.e. the output shaft rotates more slowly than the input shaft, and the high speed is a direct drive, and by selecting the appropriate pulley sizes so that the speed of the output shaft is the same as in the foregoing designs in the two available ratios, the identical effect can be obtained.

It is understood that the foregoing description is merely illustrative of preferred embodiments of this invention and that the scope of the invention therefore will not be limited thereto but will be determined by the appended claims.

I claim:

1. In combination, a variable speed engine having an output shaft, a relatively constant speed load adapted to be driven by the engine, and a multi-speed transmission connecting the output shaft of the engine with the load, said transmission comprising a plurality of balls, a carrier for the balls, means for driving the carrier in timed relation to the engine output shaft, an inner peripherally grooved member, said balls being received within the groove of said member, a relatively fixed conical ring adapted to contact the radially outer regions of the balls, an axially movable conical ring adapted to move toward and away from the balls and forming with the first conical ring a V-groove to retain the balls in the carrier, resilient means urging the axially movable ring against the balls to produce a frictional drive between the balls and the inner peripherally grooved member, hydraulically operated means for opposing the resilient means to prevent said frictional drive, a shaft connecting the peripherally grooved member to the relatively constant speed load, and means for controlling the hydraulically operated means, said controlling means comprising a speed responsive control driven in timed relation with the engine output shaft, a source of fluid under pressure, a valve for controlling the application of fluid under pressure from said source to the hydraulically operated means, and means connecting the valve to the speed responsive control whereby to prevent the frictional drive between the balls and the inner peripherally grooved member at a predetermined speed of rotation of said engine output shaft.

2. A combination as described in claim 1, said valve including a restricted exhaust port, whereby to slow down the movement of the axially movable conical ring toward the balls.

3. A combination as described in claim 1, said source of fluid under pressure including a pump, and means for driving the pump from the shaft connecting the peripherally grooved member to the constant speed load.

4. A change speed transmission comprising an input annulus having an internal cylindrical surface at one end and radially inwardly disposed splines at the other end, a carrier telescoped over the annulus and connected thereto, a ring telescoped over the carrier and having a tapered inner surface and a cylindrical outer surface forming a wall of an annular cylinder, an annular piston axially slidable on the cylindrical outer surface, a fixed housing telescoped over the piston and ring and having an inner cylindrical surface engaging the outer surface of the piston and forming the outer wall of the annular chamber, means on the housing engaging the ring to prevent relative rotation therewith, means interposed between the piston and ring to prevent relative rotation therewith, an output shaft, one-way clutch means adapted to connect the input annulus with the output shaft, and rolling means carried by the carrier and adapted to contact both the piston and the output shaft to establish a drive of the output shaft at a different speed than the input annulus.

5. A change speed transmission as described in claim 4, said one-way clutch means comprising a plurality of sprags cooperating with the internal cylindrical surface of the input annulus and with an external cylindrical surface on the output shaft, and retained on the said surfaces against relative axial movement therewith in one direction by the splines on said annulus.

6. In combination, a variable speed engine having an output shaft, a relatively constant speed load adapted to be driven by the engine, a multi-speed transmission connecting the output shaft of the engine with the load, said transmission being adapted to provide a relatively low speed drive and a relatively high speed drive, fluid pressure operated means for effecting a shift in the transmission from low to high speed drive, said load including means for supplying fluid under pressure, and control means for the shift means, said control means including a speed responsive control connected to rotate in timed relation with the engine output shaft, a valve adapted to connect the fluid pressure operated means with the source of fluid under pressure, and means for operating the valve from the speed responsive control and adapted to shift the transmission from low to high speed drive when the engine output shaft speed falls below a predetermined speed, said transmission being comprised of concentric V-groove members in which the grooves are disposed in radially opposed relation, a plurality of balls interposed in the space between the opposed grooves, and a carrier for the balls, and said fluid pressure operated means for effecting a shift in the transmission comprising means for altering the width of one of said grooves, whereby to alter the radial dimension of the space between the opposed grooves and thereby prevent or establish contact between the balls and grooves.

7. A change speed transmission as described in claim 4, said means interposed between the piston and ring to prevent relative rotation therewith comprising an axially extending pin fixed to the piston and a recess on the ring into which the pin is slidably received.

References Cited in the file of this patent

UNITED STATES PATENTS

| | | |
|---|---|---|
| 2,035,582 | Winger | Mar. 31, 1936 |
| 2,205,768 | Pearce | June 25, 1940 |
| 2,266,164 | Claytor | Dec. 16, 1941 |
| 2,282,585 | Simpson | June 16, 1942 |
| 2,311,209 | Carnagua | Feb. 16, 1943 |
| 2,375,785 | Goode et al. | May 15, 1945 |
| 2,516,059 | Lanphere | July 18, 1950 |
| 2,558,738 | Davis | July 3, 1951 |
| 2,605,651 | Winther | Aug. 5, 1952 |
| 2,692,511 | Nallinger | Oct. 26, 1954 |

FOREIGN PATENTS

| | | |
|---|---|---|
| 820,842 | France | Aug. 9, 1937 |

UNITED STATES PATENT OFFICE
CERTIFICATE OF CORRECTION

Patent No. 2,901,924                                  September 1, 1959

Oscar H. Banker

It is hereby certified that error appears in the printed specification of the above numbered patent requiring correction and that the said Letters Patent should read as corrected below.

Column 5, line 10, for "75 secured" read -- 74 secured --; same line 10, for "casting 72" read -- casting 32 --; column 6, line 3, for "sleeve 36" read -- sleeve 35 --; column 8, line 5, for "buses" read -- busses --; column 12, line 3, list of references cited, under the heading, UNITED STATES PATENTS, for the patent number "2,282,585" read -- 2,286,585 --.

Signed and sealed this 12th day of April 1960.

(SEAL)
Attest:

KARL H. AXLINE                                       ROBERT C. WATSON
Attesting Officer                                     Commissioner of Patents